Aug. 17, 1926.
W. M. BRISTOL
CITROUS FRUIT JUICE EXTRACTOR
Filed March 29, 1924
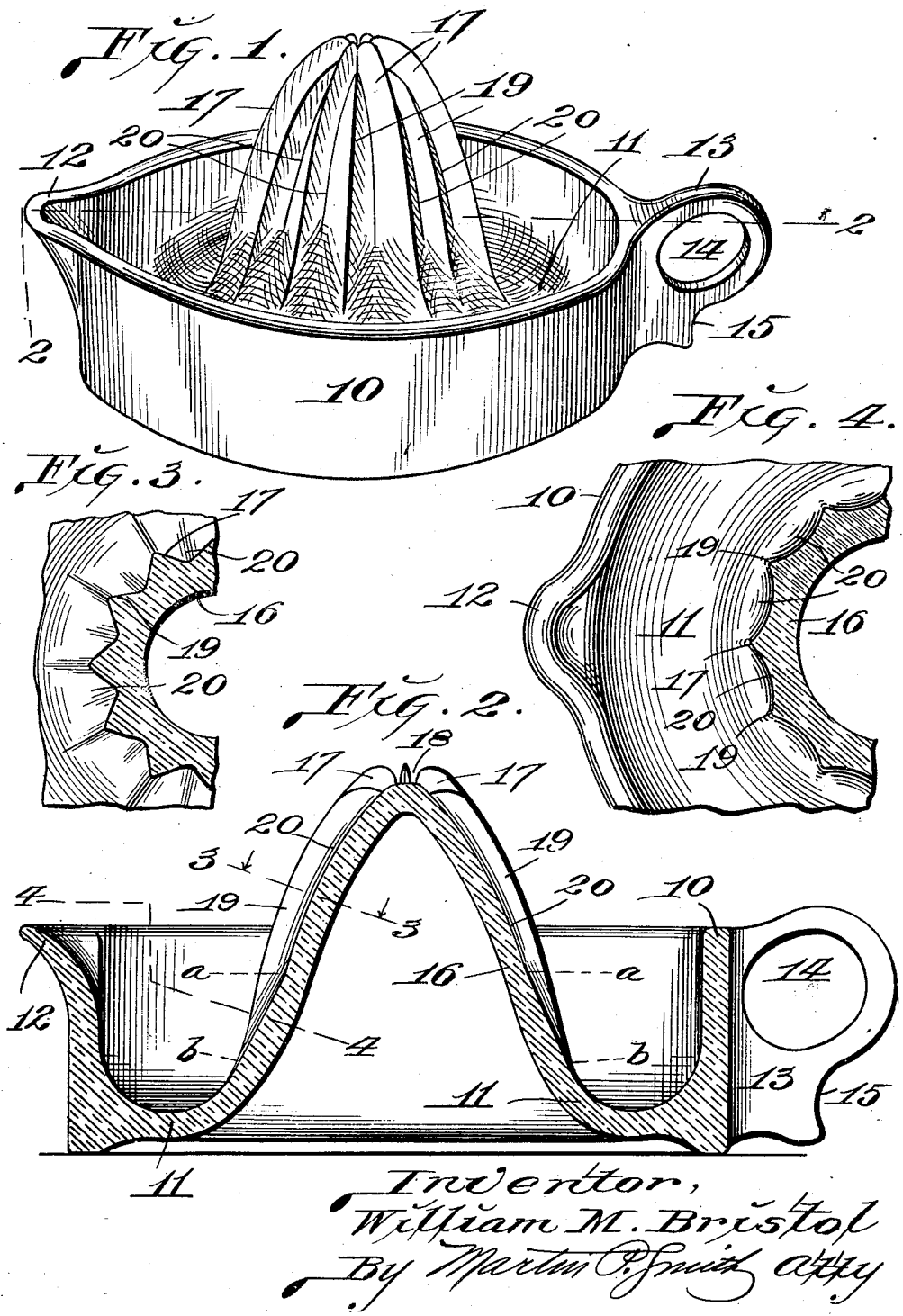

Patented Aug. 17, 1926.

1,596,148

UNITED STATES PATENT OFFICE.

WILLIAM M. BRISTOL, OF HIGHLAND, CALIFORNIA, ASSIGNOR TO CALIFORNIA FRUIT GROWERS EXCHANGE, OF LOS ANGELES, CALIFORNIA, A CORPORATION OF CALIFORNIA.

CITROUS-FRUIT-JUICE EXTRACTOR.

Application filed March 29, 1924. Serial No. 702,923.

My invention relates to a utensil, preferably formed of glass or analogous material, and which is particularly designed for extracting the juice of oranges, lemons, limes and the like, the principal objects of my invention being to generally improve upon the construction of the existing forms of similar devices; to provide an orange juice extractor that will be effective in extracting all of the juice from an orange or the like with very little effort on the part of the user; to provide a device of the character described that may be readily cleansed and kept in a sanitary condition; to provide an extractor with a juice receiving chamber of relatively large capacity; and to construct the handle of the extractor so that when the latter is manually engaged said extractor may be easily lifted, manipulated and controlled while pouring out the extracted juice.

With the foregoing and other objects in view, my invention consists in the features of construction and combination and arrangement of parts hereinafter more fully described and claimed, reference being had to the accompanying drawings, wherein:

Figure 1 is a perspective view of citrous fruit juice extractor of my improved construction;

Figure 2 is an enlarged vertical section taken approximately on the line 2—2 of Figure 1;

Figure 3 is a detail section taken approximately on the line 3—3 of Figure 2;

Figure 4 is a horizontal section taken approximately on the line 4—4 of Figure 2.

Referring by numerals to the accompanying drawings, which illustrate a practical embodiment of my invention, 10 designates the wall of the extractor, the same being preferably circular in form, when viewed in plan and projecting inwardly from the lower portion of said wall is an integral bottom member 11 that is concave in cross section. Inasmuch as this bottom member extends entirely around the wall, it cooperates therewith and with the conical or dome-shaped central portion of the extractor, hereinafter more fully described, in providing an annular chamber of relatively large capacity which receives the juice and extracted pulp from the fruit. On one side of the upper portion of wall 10 is formed an outwardly projecting pouring lip or spout 12, and on the opposite side is formed an outwardly projecting ear 13 that performs the functions of a handle for lifting and manipulating the extractor. Formed in the upper portion of this handle is an aperture 14 of such size as to receive the index finger of the user, and formed on the outer edge of the ear immediately below this aperture is a concave shoulder 15 that serves as a bearing for the second finger of the user's hand when the handle is held.

Preferably the shoulder 15 lies in a vertical plane passing through approximately the center of the aperture 14 so that the second finger of the hand will exert a forward and upward pressure to maintain the extractor horizontally with ease when it is filled with juice and is being lifted for the purpose of properly placing it so that the juice may be emptied into a receptacle.

The central portion of the extractor, or that portion upon which the fruit is engaged when the juice is extracted, comprises a substantially conical or dome-shaped member 16 that projects upwardly from the inner margin of the channel-shaped bottom 11, the apex of said central member 16 occupying a plane a short distance above the upper edge of wall 10. The lower end of the dome-shaped member 16 is substantially tangent to the inner margin of the bottom 11. The external surface of this dome-shaped central member is provided with two sets of ribs or corrugations 17, 19, the members 17 of one set extending from the lower portion of said member 16 upwardly to the top thereof and the extreme upper portions of said ribs extend slightly above the apex of the body of member 16, and their upper ends terminate at points a short distance away from the axis of said member 16, thereby forming at the apex of the conical body a relatively small pocket or space 18. The lower ends of the ribs 17, 19 are substantially tangent to the inner margin of the bottom 11. The upper ends of the ribs 17 are rounded so as not to cut into the rinds of the fruit when the same is rotated over the conical body during the juice extracting operations. The members 19 of the shorter series of ribs are alternately arranged between the longer ribs 17 and the upper ends of said shorter ribs terminate on the surface of the body of the dome-shaped member 16 at points slightly below the apex thereof and, consequently, slightly below the pocket 18 that is formed between the upwardly projecting upper ends of the longer ribs 17. The channels or grooves 20 between the ribs 17 and 19 are substantially V-shaped in horizontal section for the greater portion of their length, but as said grooves or channels approach the lower end of the dome-shaped member 16 they are gradually filled out or become more shallow in depth until they merge with the upper surface of the U-shaped bottom member 11, the bottom of said channels being substantially tangent thereto. As a result of this construction, there are no abrupt corners at the lower portions of the grooves, and this arrangement greatly facilitates the cleaning of the extractor and prevents the accumulation of pulp in the lower portions of said grooves or channels. The points where the grooves begin to decrease in depth are indicated by the dotted lines a—b, Figure 2. In the formation of the ribs 17 and 19, I prefer to make the upper portions thereof substantially V-shaped in cross section, and the bottoms of the grooves between said ribs are slightly rounded, so as to facilitate cleansing operations.

The entire extractor as described is preferably formed of molded glass, and to give the extractor a distinctive appearance and to differentiate it from other glass extractors now on the market I prefer to mold the extractor from opal or other suitable colored glass.

In the use of my improved extractor the half sections of fruit, such as oranges, are applied to the top of the ribbed member 16 and pressed downwardly thereupon and at the same time the fruit is given an intermittent rotary motion. Such action very rapidly extracts the juice from the shell or rind of the fruit by virtue of the fact that the upper portions of the longer ribs 17 project above the body of the dome-shaped member 16, thus cutting through that portion of the pulp that is located within the extreme upper portion of the shell or rind.

Obviously extractors embodying the principles of my invention may be made in different sizes for the extraction of the juice of practically all varieties of citrous fruits, for instance, the smaller varieties such as limes and lemons, and the larger varieties including oranges and grapefruit.

An orange juice extractor of my improved construction is comparatively simple, may be easily and cheaply produced and is very effective in performing its intended functions.

Minor changes in the size and form of my improved orange juice extractor may be made and substituted for those herein shown and described without departing from the spirit of my invention as set forth in the appended claims.

I claim as my invention:

1. A citrous fruit juice extractor comprising a base having an annular juice receiving member, a dome-shaped member projecting upwardly from the center of said base, vertically disposed ribs formed on the external surface of said dome-shaped member, certain of which ribs extend upwardly above the apex of said dome-shaped member, the upper ends of said upwardly extending ribs being spaced apart radially with respect to the axis of the dome-shaped member, and the upper ends of the other ribs terminating in a plane slightly below the apex of said dome-shaped member.

2. A citrous fruit juice extractor comprising a base having an annular juice receiving chamber, a dome-shaped member projecting upwardly from the inner margin of the bottom, and spaced ribs on the external surface of said member, the upper ends of said ribs terminating a short distance from the axis of the dome-shaped member to define a pocket and being rounded, the bottom of the pocket being flush with the bottoms of the inter-rib spaces.

3. In a citrous fruit juice extractor, a substantially circular base, a dome-shaped member projecting upwardly from the center of said base, a series of relatively short ribs and a series of relatively long ribs formed on the external surface of said dome-shaped member, the members of said two series of ribs being alternately arranged with the upper ends of the longer ribs projecting above the apex of the dome-shaped member and being spaced apart radially with respect to the axis of said dome-shaped member, and the lower portions of the channels between said ribs gradually decreasing in depth toward their lower ends.

In testimony whereof I affix my signature.

WILLIAM M. BRISTOL.